United States Patent [19]
Stojkovich et al.

[11] Patent Number: 5,668,428
[45] Date of Patent: Sep. 16, 1997

[54] ELECTRIC MOTOR COMMUTATOR

[75] Inventors: Predrag Stojkovich, Darien; Maureen Claire Werner, Bolingbrook; Edward Joseph Gawel, Jr., Downers Grove, all of Ill.

[73] Assignee: General Motors Corporation, Detroit, Mich.

[21] Appl. No.: 577,091

[22] Filed: Dec. 22, 1995

[51] Int. Cl.$^6$ .................................................. H02K 13/00
[52] U.S. Cl. ................................................ 310/233; 310/43
[58] Field of Search ............................ 310/43, 219, 231, 310/232, 233, 234, 235, 236, 237

[56] References Cited

U.S. PATENT DOCUMENTS

| | | | |
|---|---|---|---|
| 1,009,788 | 11/1911 | Ralston . | |
| 1,028,965 | 6/1912 | Ralston . | |
| 1,030,013 | 6/1912 | Ralston . | |
| 2,141,307 | 12/1938 | Lang et al. | 171/320 |
| 2,408,210 | 9/1946 | Heddleson et al. | 171/320 |
| 3,141,984 | 7/1964 | Rubio-Medina | 310/236 |
| 4,247,795 | 1/1981 | Stafford | 310/233 |
| 4,328,440 | 5/1982 | Stafford | 310/233 |
| 4,559,464 | 12/1985 | Stokes | 310/233 |
| 5,144,739 | 9/1992 | Balke et al. | 29/597 |

FOREIGN PATENT DOCUMENTS

| | | | |
|---|---|---|---|
| 962317 | 7/1925 | United Kingdom | 310/233 |

*Primary Examiner*—Thomas M. Dougherty
*Assistant Examiner*—B. Mullins
*Attorney, Agent, or Firm*—Robert M. Sigler

[57] ABSTRACT

The invention is a commutator for a high speed, high power DC traction motor having a rotor with a plurality of copper commutator bars having a V-shaped groove an axial end thereof, an electrically conductive retaining ring engaging the V-shaped grooves of the commutator bar, and means for exerting an axial force between the retaining ring and commutator bars to retain the latter against radial movement during high speed rotation of the rotor. Each of the commutator bars has an axial end face with a radially inwardly extending axial depression which joins an axially extending radial depression in a radially inner axial surface thereof adjacent the retaining ring. The retaining ring has an axial end face aligned with the axial end face of the commutator bars and an outwardly radially extending axial depression which joins an axially extending radial depression in a radially outer axial surface thereof adjacent the commutator bars. An electrically insulating ring comprising a high density, calendared, polyamide paper is disposed between the retaining ring and the V-shaped groove of the commutator bar to prevent physical and electrical contact therebetween and assist the structural stability of the commutator at high speed rotation in widely varying temperatures and has an axial edge projecting into a groove formed by the axially extending radial depressions of the commutator bars and retaining ring. An arc resistant, hydrophobic, silicone polymer fills the axially extending radial depressions and radially extending axial depressions of the commutator bars and retaining ring to form an insulating band sealingly engaging the axial edge of the electrically insulating ring.

2 Claims, 2 Drawing Sheets

ELECTRIC MOTOR COMMUTATOR

BACKGROUND OF THE INVENTION

The technical field of this invention is electric motors, and particularly DC traction motors for diesel-electric locomotives. Such motors are necessarily powerful, typically generating up to 750 horsepower, and must be ruggedly built to withstand the forces generated. The commutators of such motors may comprise as many as 210 copper commutator bars, weighing close to one pound (2.2 kg) each, all of which must be held in a stable structure on a rotor against centrifugal force at rotational speeds up to 2,900 RPM and at temperatures up to 150° C. The commutator bars must further be electrically insulated from the supporting steel members of the rotor at voltages up to 1,500 volts and in an environment exposed to water and contaminants which can create electrical creepage paths at the high voltages across exposed surfaces. Locomotive traction motors are operated at varying speeds and temperatures and are subject to severe shock loads and vibration. The resulting widely varying loads and thermal expansion/contraction cause relative movement between the commutator bars and their supporting members during motor operation.

The need to retain structural stability while allowing some internal movement due to the high and greatly varying loads has resulted in a prior art commutator structure in which the commutator bars are provided at opposing axial ends with V-shaped grooves and are retained against centrifugal force by a pair of retaining rings each having a V-shaped projection to engage the V-shaped grooves of the bars. Force exerting means such as threaded bolts pull the retaining rings together axially to firmly retain the bars while allowing a small amount of relative motion. Differences in the distribution of the total tensile load among the various surfaces have produced a number of different commutator types, of which this invention is concerned with a modified archbound construction.

Since the retaining tings are generally made of steel, which is electrically conducting, they must be electrically insulated from the copper commutator bars. A favored method has been to provide a V-cross-sectioned insulating ring of a high density, calendared, polyamide paper such as NOMEX ® over the V-shaped projection of each retaining ting to physically and electrically insulate the ring from each of the commutator bars while helping to provide mechanical stability of the parts. However, the commutator bars and retaining rings are physically very close together—separated by only the thickness of the insulating ring. Thus, at each end of the commutator bars, the respective retaining ring and its accompanying insulting ring are extended axially significantly beyond the end of the commutator bars. This provides an insulated surface distance between the adjacent exposed surfaces of the retaining ring and commutator bars which is sufficient to resist the formation of creepage paths thereacross by water and contaminants. To prevent radial expansion, due to centrifugal force, of the exposed axial ends of the insulating rings, which would allow contaminants to creep under the insulating ring, each is radially restrained by a circularly wrapped string or similar substance, and various sealing parts and materials are provided to attempt to seal the joints between the commutator bars, retaining ring and insulating ring. However, the arrangement is not as rugged as is desired and further takes up axial rotor length which thus cannot be used for rotor windings.

SUMMARY OF THE INVENTION

The invention is a commutator for a high speed, high power DC traction motor having a rotor with a plurality of copper commutator bars having a V-shaped groove an axial end thereof, an electrically conductive retaining ring engaging the V-shaped grooves of the commutator bar, and means for exerting an axial force between the retaining ring and commutator bars to retain the latter against radial movement during high speed rotation of the rotor. Each of the commutator bars has an axial end face with a radially inwardly extending axial depression which joins an axially extending radial depression in a radially inner axial surface thereof adjacent the retaining ring. The retaining ring has an axial end face aligned with the axial end face of the commutator bars and an outwardly radially extending axial depression which joins an axially extending radial depression in a radially outer axial surface thereof adjacent the commutator bars. An electrically insulating ring comprising a high density, calendared, polyamide paper is disposed between the retaining ring and the V-shaped groove of the commutator bar to prevent physical and electrical contact therebetween and assist the structural stability of the commutator at high speed rotation in widely varying temperatures and has an axial edge projecting into a groove formed by the axially extending radial depressions of the commutator bars and retaining ring. An arc resistant, hydrophobic, silicone polymer fills the axially extending radial depressions and radially extending axial depressions of the commutator bars and retaining ring to form an insulating band sealingly engaging the axial edge of the electrically insulating ring.

DESCRIPTION OF A PREFERRED EMBODIMENT

Figure 1:
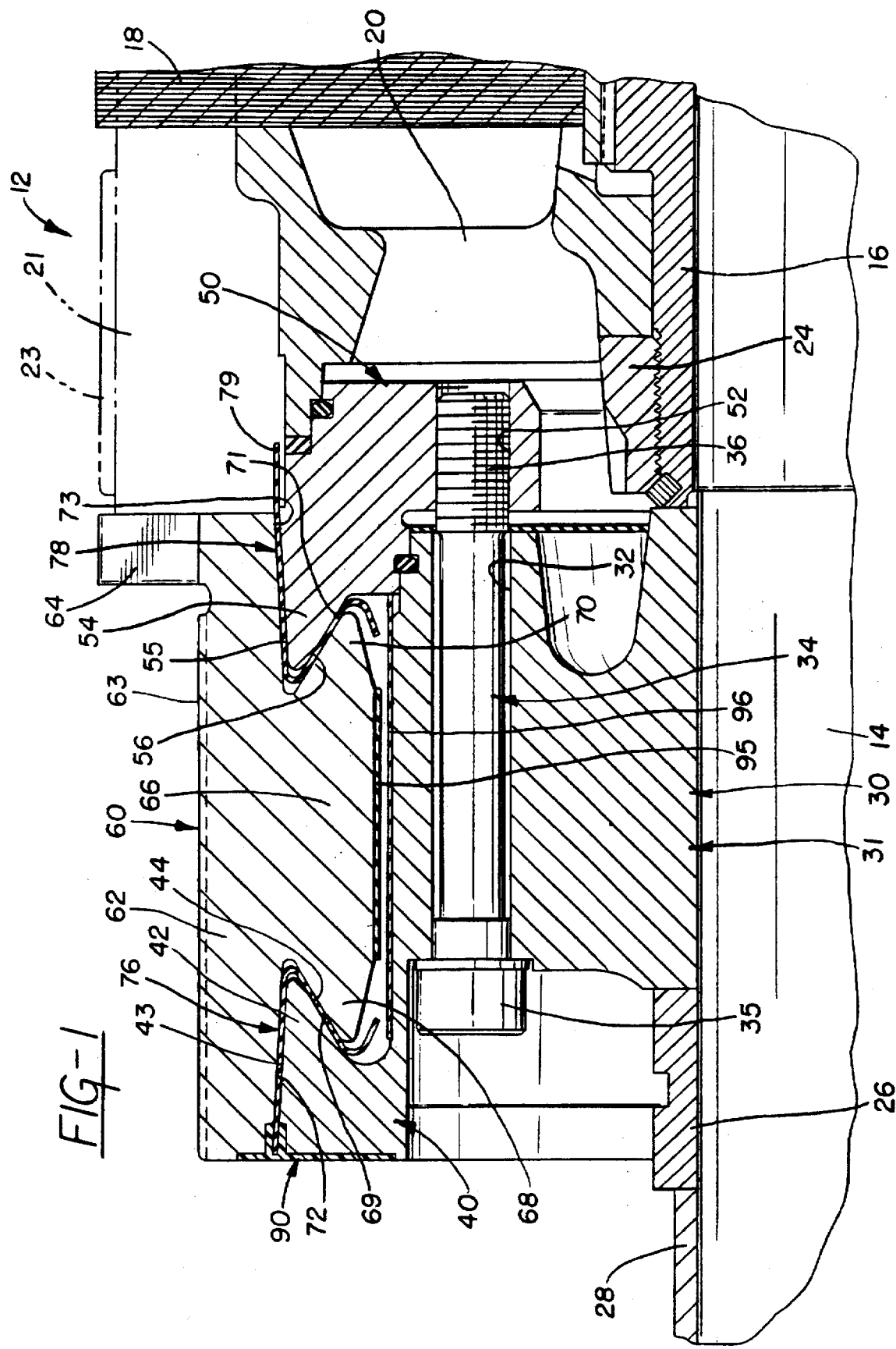
FIG. 1 is an section view through the axis of a portion of a commutator according to the invention.

Referring to FIG. 1, a DC electric motor comprises a rotor 12 built around a shaft 14. A coil spider 16 is press fit on shaft 14 to support laminations 18 and a coil support 20, the latter being retained by a nut 24 threaded on coil spider 16. Coil support 20 supports the rotor windings, not shown, in the normal manner. A commutator spider 30, typically made of steel, is press fit on shaft 14 to abut the end of coil spider 16. To the outer end of shaft 14 (left in FIG. 1) from spider 30 are a commutator end collar 26 and a commutator end spacer 28, which help locate and retain the shaft end bearing, not shown. Commutator spider 30 has a lower portion 31 having an axial opening 32 for a bolt 34 having a head 35 abutting spider 30 and a threaded end 36 threaded into an internally threaded opening 52 of a V-ring 50, also typically made of steel. The upper portion 40 of spider 30 projects axially toward the outer axial end of shaft 14, to the left in FIG. 1. As seen enlarged in FIG. 3, the axially inner side of upper portion 40 of spider 30 comprises a V-shaped projection 42 pointing axially inwardly toward coil support 20 and having an upper surface 43, and a lower surface 44. Similarly, V-ring 50 comprises a V-shaped projection 54, extending axially outwardly toward V-shaped projection 42 of spider 30 and having an upper surface 55 and a lower surface 56. V-shaped projection 54 is essentially a mirror image of V-shaped projection 42.

Figure 2:
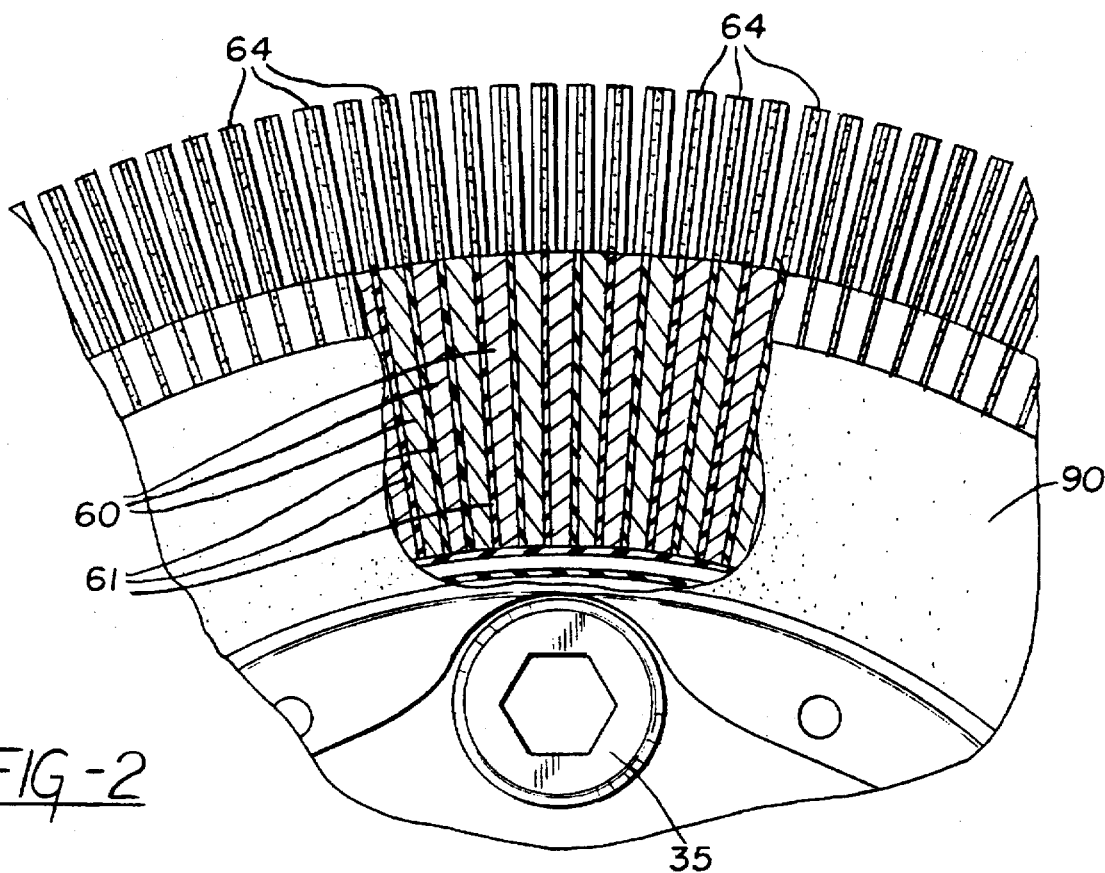
FIG. 2 is an axial end view of the commutator of FIG. 1 which is partly cut away to show internal structure.

A copper commutator bar 60 is one of a plurality of such bars which are axially aligned and radially spaced around shaft 14, the bars 60 being separated by insulating mica spacers 61, as seen in FIG. 2. Commutator bar 60 has an upper portion 62 including an upper brush surface 63 and an upwardly projecting coil connecting tang 64. Tangs 64 are used for connection to the windings, which are not shown in the figures but which occupy the space 21 radially outward of coil support 20 and are wrapped with a glass band 21 and sealed with varnish in the normal manner. Stationary brushes, not shown, engage the upper brash surfaces 63 of commutator bars 60 in motor operation.

A lower portion 66 of commutator bar 60 has axially extending V-shaped projections 68 and 70 at the outer and inner axial ends thereof, respectively. V-shaped projection 68 of commutator bar 60, also seen enlarged in FIG. 3, has an upper surface 69 adjacent and substantially parallel to lower surface 44 of V-shaped projection 42 of spider 30; and V-shaped projection 70 has an upper surface 71 adjacent and substantially parallel to lower surface 56 of V-shaped projection 54 of V-ring 50. Upper portion 62 of commutator bar 60 has, near its outer axial end, a lower surface 72 adjacent and substantially parallel to upper surface 43 of V-shaped projection 42 of spider 30. Likewise, upper portion 62 of commutator bar 60 has, near its inner axial end, a lower surface 73 adjacent and substantially parallel to upper surface 55 of V-shaped projection 54 of V-ring 50.

An electrically insulating ring 76 has a generally V-shaped cross section to separate surface 43 of spider 30 from the surfaces 72 of commutator bars 60 and to separate surface 44 of spider 30 from surfaces 69 of commutator bars 60. A similar electrically insulating ring 78 has a generally V-shaped cross section to separate surface 55 of spider 30 from the surfaces 73 of commutator bars 60 and to separate surface 56 of spider 30 from surfaces 71 of commutator bars 60. Rings 76 and 78 are made of a high density, calendared, polyamide paper such as NOMEX ®. Electrically insulating members 95, adjacent the radially inner surfaces of commutator bars 60, and 96, adjacent the radially outer surface of lower portion 31 of spider 30, complete the electrically insulating barrier between spider 30 and commutator bars 60. Bolts 34 exert an axial force between spider 30 and V-ring 50 to engage the V-shaped projection 42 of spider 30 against insulating ring 76 in a V-shaped groove formed by surfaces 69 and 72 of each commutator bar 60 and to engage V-shaped projection 54 of V-ring 50 against insulating ring 78 in a V-shaped groove formed by surfaces 71 and 73 of each commutator bar 60. Surfaces 43, 72, 55 and 73 are typically angled 3° from axial and surfaces 44, 69, 56 and 71 are typically angled 30° from axial, so that 10% of the force generated by bolts 34 is exerted between surfaces 43 and 72 and between surfaces 55 and 73 and 90% of the force is exerted between surfaces 44 and 69 and between surfaces 56 and 71, in a modified arch-bound construction. Spider 30 and V-ring 50 thus comprise retaining rings for commutator bars 60 in the commutator of rotor 12. Centrifugal force from high speed rotation and differential expansion and contraction from a wide temperature variation cause some relative movement between commutator bars 60, spider 30 and V-ring 50 in the operation of motor the motor; but the construction described above, with the insulating rings 76 and 78 and the proportioning of the forces between the 3° and 10° surfaces, allows such movement while maintaining structural integrity of the commutator, as is known in the prior art.

The successful performance of such commutators depends to a great degree on insulating rings 76 and 78, which must provide electrical insulation to withstand as much as 1,500 volts while surviving, and helping to provide structural stability in spite of, high forces and highly variable temperatures. In locomotive traction motor applications, they are exposed to moisture and contaminants, which can build up on exposed surfaces of the insulating rings to form electrically conducting creepage paths between the commutator bars and retaining rings. To prevent such a creepage path from easily forming directly across the end of the thin (on the order of 1.5 mm) insulating ring, insulating ring 78 is extended axially, as in the prior art, past the inner end of commutator bar 60. In this embodiment, this method is sufficient for ring 78, since it is sealed within rotor 12 on the inner (coil) side of the commutator and is thus relatively protected from contaminants and moisture. However, the other ends of commutator bars 60, as well as the axially outer ends of insulating ring 76 and spider 30, would not be as reliably protected with such a structure.

Figure 3:
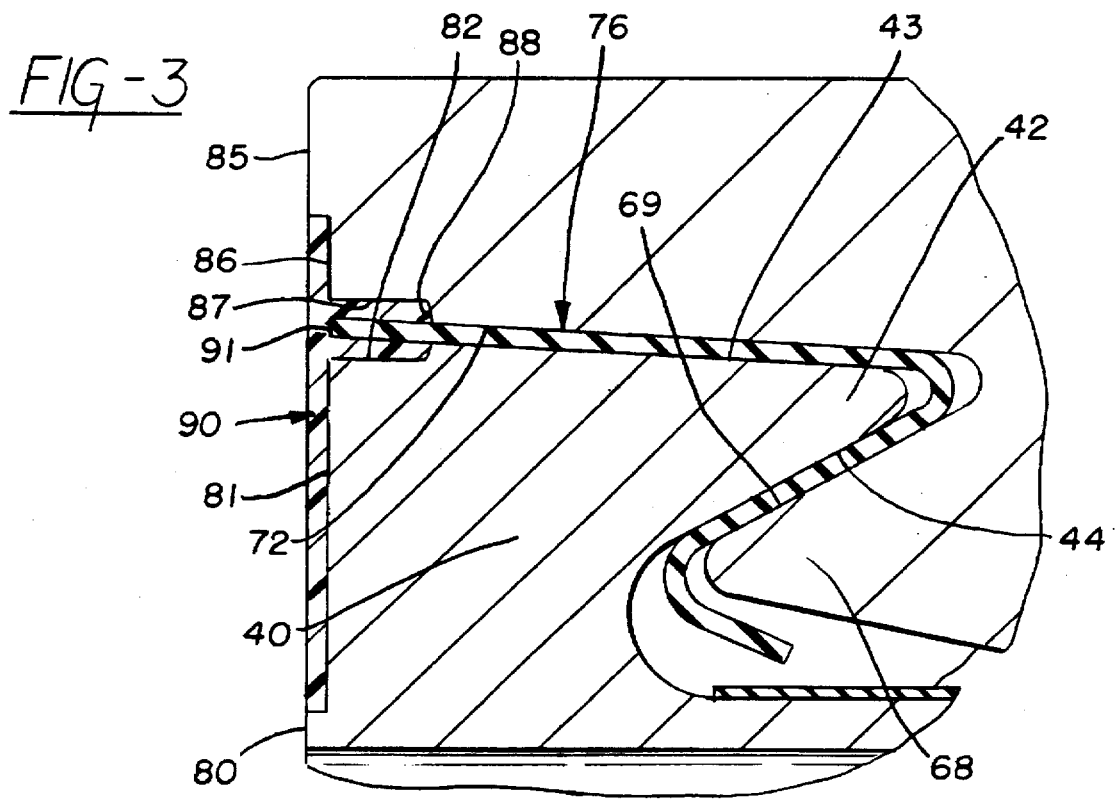
FIG. 3 is an enlarged view of a portion of FIG. 1.

Therefore, the commutator of this invention improves on the prior art as seen in FIG. 3. An outer axial end face 80 of upper portion 40 of spider 30 is provided with a radially outwardly extending depression 81 which joins an axially outwardly extending radial depression 82 in upper surface 43. Similarly, the outer axial face 85 of upper portion 62 of commutator bar 60 is provided with a radially inwardly extending depression 86 which is radially aligned with depression 81 and joins an axially outwardly extending radial depression 87 in lower surface 72, depression 87 being adjacent depression 82 to form an axially inwardly projecting groove 88. The volume created by depressions 81, 82, 86 and 87 is filled with SYLGARD HVIC ® to form an insulating band 90; into which, within the groove formed by depressions 82 and 87, an outer axial end 91 of insulating ring 76 projects and is thus sealingly retained. Insulating band 90 provides a radially extended creepage path between exposed conductive surfaces of spider 30 and commutator bars 60 while sealing the joints between the ends of commutator bar 60, ring 76 and spider 30. Further, the flexibility of insulating band 90 allows maintenance of the seal while retaining the NOMEX ® or similar insulating rings with their structural as well as insulating advantages in high speed rotation, shocks and temperature expansion and contraction. In addition, by eliminating the need for extending spider 30 axially past the end of commutator bars 60, it allows a slightly larger proportion of the axial length of rotor 12 to be used for windings, thus improving the efficiency of the motor.

We claim:

1. A commutator adjacent one end of a rotor shaft of an electric motor, the commutator comprising, in combination, a plurality of copper commutator bars axially aligned and circumferentially spaced around the rotor shaft, each of the commutator bars having a V-shaped groove at an axial end thereof adjacent an end of the rotor shaft;

an electrically conducting retaining ring adjacent the V-shaped grooves of the commutator bars;

means for exerting an axial force between the retaining ring and the commutator bars, whereby the commutator bars are retained thereby against radial movement during high speed rotation of the rotor;

each of the commutator bars having an axial end face radially outward of the V-shaped groove with a radially inwardly extending axial depression which joins an axially extending radial depression in a radially inner axial surface thereof adjacent the retaining ring;

the retaining ring having an axial end face aligned with the axial end faces of the commutator bars with a radially outwardly extending axial depression which joins an axially extending radial depression in a radially outer axial surface thereof adjacent the commutator bars;

an electrically insulating ring comprising a high density, calendared, polyamide paper disposed between the retaining ring and the first V-shaped grooves of the commutator bars to prevent physical and electrical contact therebetween and assist the structural stability of the commutator at high speed rotation in widely varying temperatures, the electrically insulating ring having an axial edge projecting into a groove formed by the axially extending radial depressions of the commutator bars and the retaining ring; and an arc resistant, hydrophobic, silicone polymer filling the axially extending radial depressions and radially extending axial depressions of the commutator bars and the retaining ring to form an insulating band sealingly engaging the axial edge of the electrically insulating ring.

2. The commutator of claim 1 in which each of the commutator bars has another V-shaped groove at the opposite end thereof with another retaining ring adjacent the other V-shaped groove and another electrically insulating ring comprising a high density, calendared, polyamide paper disposed therebetween and the means for exerting an axial force exerts the axial force between retaining rings, whereby the commutator bars are retained thereby against radial movement during high speed rotation of the rotor.

* * * * *